Figures 1, 2:
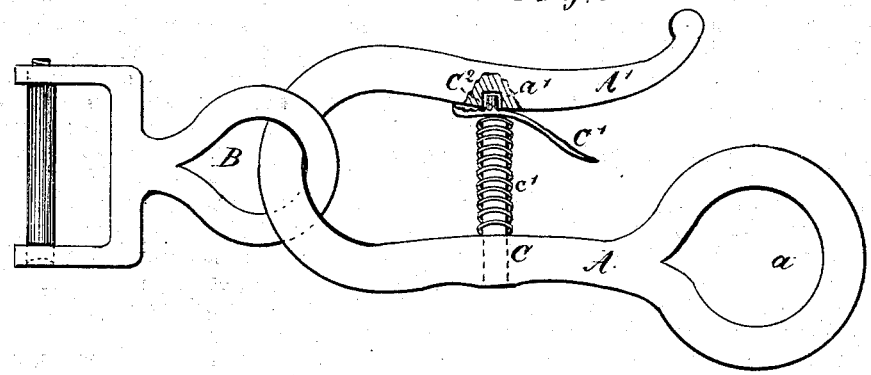

E. MAYNARD.
WHIFFLETREE-HOOK.

No. 171,235. Patented Dec. 21, 1875.

Witnesses
Henry Orth
Henri Guillaume

Inventor:
Ezra Maynard
by Abbott & Co attys

UNITED STATES PATENT OFFICE.

EZRA MAYNARD, OF NORTH WASHINGTON, OHIO.

IMPROVEMENT IN WHIFFLETREE-HOOKS.

Specification forming part of Letters Patent No. 171,235, dated December 21, 1875; application filed November 6, 1875.

*To all whom it may concern:*

Be it known that I, EZRA MAYNARD, of North Washington, in the county of Hardin and State of Ohio, have invented certain new and useful Improvements in Whiffletree-Hooks; and I do hereby declare that the following is a full, clear, and exact description thereof, which will enable others skilled in the art to which it pertains to make and use the same, reference being had to the accompanying drawing, and to the letters of reference marked thereon, which form a part of this specification.

Figure 1 is a side view of my improved hook, and Fig. 2 is a view showing more plainly the shape of the thumb-piece.

The hook is made in substantially the usual form—that is, the shank A has an eye, $a$, formed at the end, and the return arm $A'$ extends to a point nearly opposite to the eye.

B represents a cockeye attached to the trig or trace, or a link of a trace-chain. C is the latch-bar, sliding freely in a seat or slot, cut or punched for its reception in the shank A of the hook. $C'$ is a thumb-piece and guide secured to and moving with the latch-bar C. That end of the guide $C'$ which is connected with the latch-bar is expanded and formed into two lips, $c\ c$, which, when the latch-bar is pressed against the part $A'$ of the hook by the action of the spiral spring $c^1$, clasps and fits closely said part $A'$. The spring $c^1$ surrounds the latch-bar, one end of the spring pressing against the thumb-piece, while the other end rests against the part A of the hook. $a'$ is a recess or socket in the inner face of the part $A'$ of the hook. $c^2$ (see Fig. 2) is a portion of the latch-bar C, which enters the socket $a'$, and the two lips $c\ c$ serve as guides to insure that spur $c^2$ shall enter the socket $a'$, and also preserve the eye B from coming in contact with this spur when the eye is passing the latch-bar. That part of the latch-bar C which slides in the part A of the hook is flat or square, in order that the bar may not turn around in its seat, thus insuring that the thumb-piece and guide $C'$ shall be always kept in proper position relative to the other parts of the device.

Among the advantages possessed by my device over others of which I have any knowledge are the following: It can be placed so near to the outer end of the hook that the link or eye B cannot get back far enough upon the shank of the hook to become locked or cramped thereon. It requires no additional length of hook; in fact, a much shorter hook can be used than with any other construction, from the fact that the length of the spring is governed by the spread of the hook. It can be applied to many of the iron hooks in common use upon whiffletrees by simply punching a hole in the part A for the latch-bar to slide in, as the socket $a'$ and projecting end $c^2$ may, in such cases, be dispensed with, although I prefer to use them.

When thus applied to old hooks, the latch-bar and spring may be put in place by spreading the part $A'$ far enough from the part A to permit the insertion of said bar, and then closing up the hook again, care being taken not to heat the spring sufficiently to destroy its temper; or by griping the part A in a vice, and then with a wrench twisting the part $A'$ to one side so as to permit the insertion of the latch-bar, and then returning the part $A'$ to its proper position.

Having thus described my invention, what I claim is—

In combination with the hook A $A'$, the latch-bar C, sliding in the shank A, and at right angles thereto, and carrying the thumb-piece and guide $C'$, substantially as set forth.

In testimony that I claim the foregoing as my own, I affix my signature in presence of two witnesses.

EZRA MAYNARD.

Witnesses:
S. M. ANDRUS,
C. A. GRUDER.